US012775469B2

(12) United States Patent
Colenbrander

(10) Patent No.: US 12,775,469 B2
(45) **Date of Patent: *Oct. 27, 2026**

(54) NETWORK ARCHITECTURE FOR REMOTE BOOT INSTALLATION OF COMPUTE NODES FOR CONTEXT SWITCHING USING BOOT CONTROLLERS

(71) Applicant: Sony Interactive Entertainment Inc., Tokyo (JP)

(72) Inventor: Roelof Roderick Colenbrander, Costa Mesa, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 18/781,920

(22) Filed: Jul. 23, 2024

(65) Prior Publication Data

US 2024/0378061 A1 Nov. 14, 2024

Related U.S. Application Data

(63) Continuation of application No. 17/694,023, filed on Mar. 14, 2022, now Pat. No. 12,045,627.

(51) Int. Cl.
*G06F 9/4401* (2018.01)
*G06F 9/48* (2006.01)
(Continued)

(52) U.S. Cl.
CPC .......... *G06F 9/4416* (2013.01); *G06F 9/4406* (2013.01); *G06F 9/4856* (2013.01); *G06F 15/7867* (2013.01); *H04L 41/0816* (2013.01)

(58) Field of Classification Search
None
See application file for complete search history.

(56) References Cited

U.S. PATENT DOCUMENTS 11,927,999 B2 * 3/2024 Faasse ...................... G06F 1/20
2015/0263743 A1 9/2015 Nakanishi et al.
(Continued)

FOREIGN PATENT DOCUMENTS

CN 111420397 A 7/2020
JP 11232237 A 8/1999
(Continued)

OTHER PUBLICATIONS

EP23713810.2 "Office Action", Nov. 5, 2025, 10 pages.
(Continued)

*Primary Examiner* — Fahmida Rahman
(74) *Attorney, Agent, or Firm* — Kilpatrick Townsend & Stockton LLP

(57) ABSTRACT

A method for performing a system start up. The method including receiving at a board management controller (BMC) a startup configuration instruction to boot up a compute node with an operating system, wherein the compute node is located on a sled including a plurality of compute nodes, wherein the BMC is configured for managing a plurality of communication interfaces providing communication to the plurality of compute nodes. The method including sending a boot instruction from the BMC to a boot controller of the compute node over a communication interface to execute a basic input/output system (BIOS) firmware that is stored remote from the compute node. The method including performing execution of the BIOS firmware on the compute node to initiate loading of the operating system for execution by the compute node.

20 Claims, 7 Drawing Sheets

400

(51) Int. Cl.
*G06F 15/78* (2006.01)
*H04L 41/0816* (2022.01)

(56) References Cited

U.S. PATENT DOCUMENTS

| | | | | |
|---|---|---|---|---|
| 2015/0263943 | A1 | 9/2015 | Sonoda et al. | |
| 2017/0353347 | A1 | 12/2017 | Li | |
| 2019/0020540 | A1 | 1/2019 | Yen et al. | |
| 2019/0196907 | A1 | 6/2019 | Khan et al. | |
| 2021/0081024 | A1* | 3/2021 | Wu | G06F 13/385 |
| 2021/0200555 | A1* | 7/2021 | Wu | G06F 9/4416 |
| 2021/0255979 | A1 | 8/2021 | Colenbrander | |
| 2021/0286667 | A1* | 9/2021 | Yigzaw | G06F 11/0772 |

FOREIGN PATENT DOCUMENTS

| | | | |
|---|---|---|---|
| JP | 2015512535 | A | 4/2015 |
| WO | 2013069136 | A1 | 5/2013 |

OTHER PUBLICATIONS

CN202380037681.6, "Office Action", Aug. 31, 2025, 12 pages.
Jp2024-554891, "Notice of Allowance", Sep. 16, 2025, 5 pages.
EP23713810.2 , "Office Action", May 29, 2026, 5 pages.

* cited by examiner

500

NETWORK ARCHITECTURE FOR REMOTE BOOT INSTALLATION OF COMPUTE NODES FOR CONTEXT SWITCHING USING BOOT CONTROLLERS

CLAIM OF PRIORITY

This application is a continuation of and claims priority to and the benefit of commonly owned, U.S. patent application Ser. No. 17/694,023, filed on Mar. 14, 2022, entitled "Sled Level Boot Management Control Of Compute Nodes For Context Switching Using Boot Controllers," the disclosure of which is herein incorporated by reference in its entirety for all purposes.

CROSS REFERENCE TO RELATED APPLICATIONS

The present application is related to U.S. patent application Ser. No. 16/945,635, filed Jul. 31, 2020, entitled "NETWORK ARCHITECTURE PROVIDING HIGH SPEED STORAGE ACCESS THROUGH A PCI EXPRESS FABRIC BETWEEN A COMPUTE NODE TO A STORAGE SERVER,", the disclosure of which is herein incorporated by reference in its entirety for all purposes. The present application is related to U.S. patent application Ser. No. 17/175,636, filed Feb. 13, 2021, entitled "NETWORK ARCHITECTURE PROVIDING HIGH SPEED STORAGE ACCESS THROUGH A PCI EXPRESS FABRIC BETWEEN A COMPUTE NODE AND A STORAGE SERVER WITHIN AN ARRAY OF COMPUTE NODES," the disclosure of which is herein incorporated by reference in its entirety for all purposes.

TECHNICAL FIELD

The present disclosure is related to remote starting of computing resources, including remote boot control of a compute node, such as a compute node of a compute sled of a streaming array of a rack assembly, and network reconfiguration of rack assemblies of a data center.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multiplayer gaming, sharing of assets between players, sharing of instant experiences between players and/or spectators, allowing friends to watch a friend play a video game, having a friend join the on-going game play of a friend, and the like.

Data centers may be configured with multiple computing resources for supporting online or cloud gaming. For example, each of the computing resources can be configured to execute gaming applications for game plays of gaming applications that can then be streamed to users. Demand for the computing resources may fluctuate depending on one or more parameters, including the time period for the demand, geographic region of the demand, types of gaming being pursued, etc. There may be time periods when compute resources sit idle because there is limited demand for the computing resources for online gaming.

Data centers specifically purposed for online gaming may be restricted from implementing short term changes to the computing resources in order to handle other various computing services different from gaming. That is, because the computing resources are configured for gaming, those computing resources are not configured for providing other types of services that require applications requiring different computing resource platforms. Changing the configurations of these computing resources to support these other services may be impossible when the computing resources are statically configured. Changing the configurations of these computing resources may also prove difficult when they require changing configuration parameters locally on the computing resources before any configuration change is implemented.

It is in this context that embodiments of the disclosure arise.

SUMMARY

Embodiments of the present disclosure relate to providing remote booting of computing resources, including remote boot control of a compute node, such as a compute node of a compute sled of a streaming array of a rack assembly, and network reconfiguration of rack assemblies of a data center.

Embodiments of the present disclosure disclose a method for performing a system start up. The method including receiving at a board management controller (BMC) a startup configuration instruction to boot up a compute node with an operating system, wherein the compute node is located on a sled including a plurality of compute nodes, wherein the BMC is configured for managing a plurality of communication interfaces providing communication to the plurality of compute nodes. The method including sending a boot instruction from the BMC to a boot controller of the compute node over a communication interface to execute a basic input/output system (BIOS) firmware that is stored remote from the compute node. The method including performing execution of the BIOS firmware on the compute node to initiate loading of the operating system for execution by the compute node.

Other embodiments of the present disclosure disclose a method. The method including detecting at a cloud management controller declining demand for a first priority of services supported by a data center including a plurality of rack assemblies, wherein each of the plurality of rack assemblies is configured in a first configuration that facilitates the first priority of services, wherein the cloud management controller manages configurations of the plurality of rack assemblies, wherein the first priority of services is implemented by a first plurality of applications. The method including sending from a cloud management controller a reconfiguration message to a rack controller of a rack assembly to reconfigure the rack assembly from the first configuration to a second configuration, wherein the second configuration facilitates a second priority of services, wherein the second priority of services has a lower priority than the first priority services wherein the second plurality of services is implemented by a second plurality of applications. The method including configuring the rack assembly in the second configuration. Each rack assembly of the plurality of rack assemblies includes one or more network storages and one or more streaming arrays, wherein each streaming array includes a one or more compute sleds, wherein each compute sled includes one or more compute nodes.

Other embodiments of the present disclosure disclose a non-transitory computer-readable medium storing a computer program for performing a system start up. The non-transitory computer-readable medium including program instructions for receiving at a board management controller (BMC) a startup configuration instruction to boot up a compute node with an operating system, wherein the compute node is located on a sled including a plurality of compute nodes, wherein the BMC is configured for managing a plurality of communication interfaces providing communication to the plurality of compute nodes. The non-transitory computer-readable medium including program instructions for program instructions for sending a boot instruction from the BMC to a boot controller of the compute node over a communication interface to execute a basic input/output system (BIOS) firmware that is stored remote from the compute node. The non-transitory computer-readable medium including program instructions for program instructions for performing execution of the BIOS firmware on the compute node to initiate loading of the operating system for execution by the compute node.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, embodiments of the present disclosure provide for remote boot control of a compute node, such as a compute node of a compute sled of a streaming array of a rack assembly. In particular, external hardware is used in a boot process of a compute node, such that no storage is needed, which allows flexibility in what software is used for external booting. Also, embodiments of the present disclosure provide for network reconfiguration of rack assemblies of a data center. In particular, dark time utilization of computing resources of a data center is achieved through reconfiguration of networking of a rack assembly, such as reconfiguring internal networking to provide for compute node to compute node communication within a rack assembly over a network interface.

With the above general understanding of the various embodiments, example details of the embodiments will now be described with reference to the various drawings.

Throughout the specification, the reference to "application" or "game" or "video game" or "gaming application" or "game title" is meant to represent any type of interactive application that is directed through execution of input commands. For illustration purposes only, an interactive application includes applications for gaming, word processing, video processing, video game processing, etc. Further, the terms introduced above are interchangeable.

Figure 1:
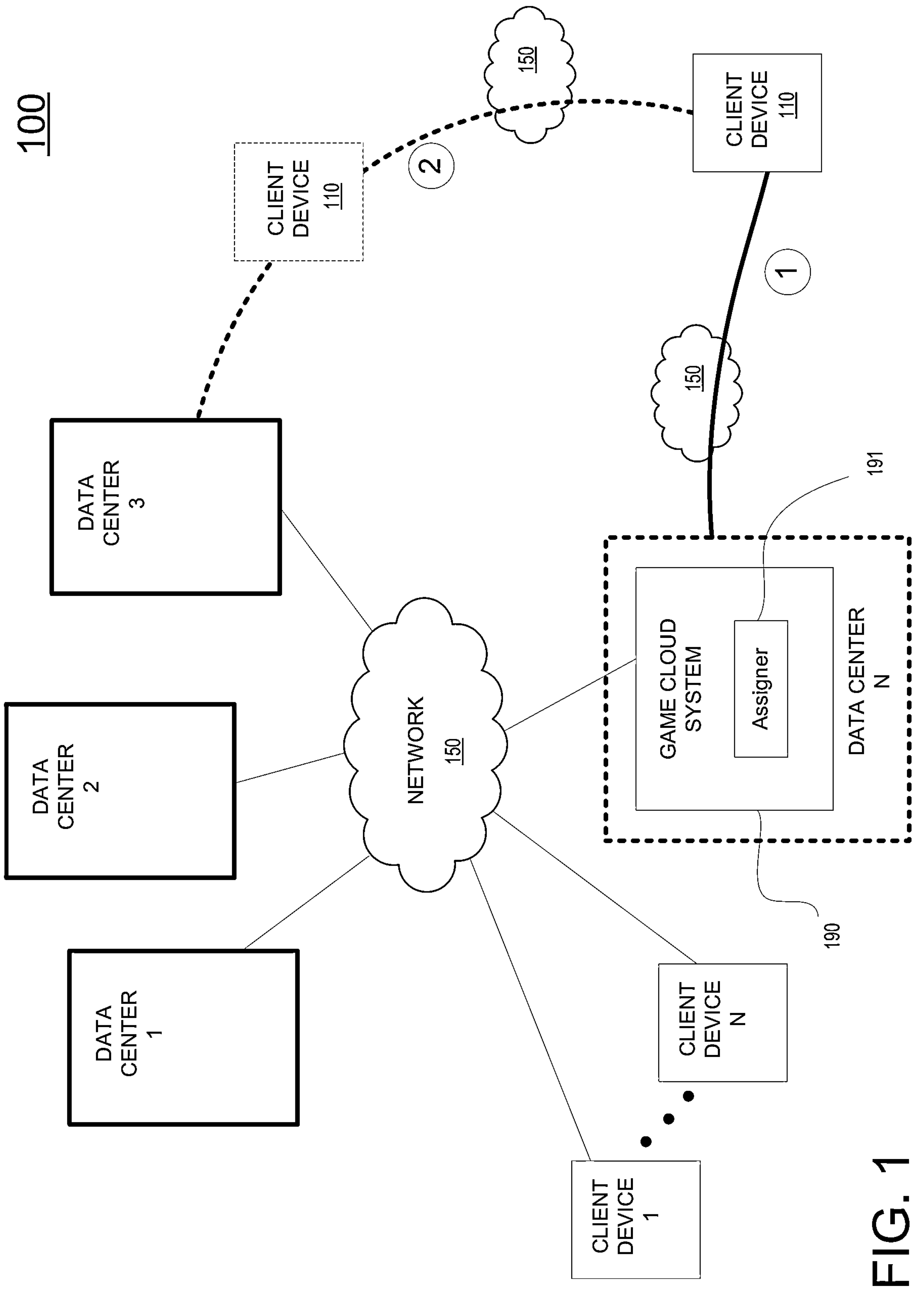
FIG. 1 is a diagram of a game cloud system for providing gaming over a network between one or more compute nodes located at one or more data centers, in accordance with one embodiment of the present disclosure.

FIG. 1 is a diagram of a system 100 for providing gaming over a network 150 between one or more compute nodes located at one or more data centers, in accordance with one embodiment of the present disclosure. The system is configured to provide gaming over a network between one or more cloud gaming servers, and more specifically is configured for remote boot control of a compute node, such as a compute node of a compute sled of a streaming array of a rack assembly, and for network reconfiguration of rack assemblies of a data center to provide for better utilization of computing resources (e.g., multiple purposes) in the data centers, in accordance with embodiments of the present disclosure. Cloud gaming includes the execution of a video game at the server to generate game rendered video frames, which are then sent to a client for display.

It is also understood that cloud gaming and/or other services may be performed using physical machines (e.g., central processing units—CPUs—and graphics processing units—GPU), or virtual machines, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. Instant utilization defined for the user or game can be utilized when saving a user's gaming session. The instant utilization can include any number of configurations described herein to optimize the fast rendering of video frames for a gaming session. In one embodiment, the instant utilization defined for the game or the user can be transferred between data centers as a configurable setting. The ability to transfer the instant utilization setting enables for efficient migration of game play from data center to data center in case the user connects to play games from different geo locations.

System 100 includes a game cloud system 190 as implemented through one or more data centers (e.g., data centers 1 through N). As shown an instance of game cloud system 190 could be located in data center N that provides management functionality, wherein the management functionality of the game cloud system 190 may be distributed through multiple instances of the game cloud system 190 at each of the data centers. In some implementations, the game cloud system management functionality may be located outside of any of the data centers.

That game cloud system 190 includes an assigner 191 that is configured to assign each of the client devices (e.g., 1-N) to corresponding resources in corresponding data centers. In particular, when client device 110 logs into the game cloud system 190, the client device 110 may be connected with an instance of a game cloud system 109 at data center N, wherein data center N may be geographically closest to client device 110. The assigner 191 is able to perform diagnostic testing to determine available transmit and receive bandwidth to the client device 110. Also, diagnostic testing includes determining latency and/or round trip time between a corresponding data center and a client device 110. Based on the testing, the assigner 191 is able to assign resources to client device 110 with great specificity. For example, the assigner 191 is able to assign a particular data center to the client device 110. In addition, the assigner 191 is able to assign to the client device 110 a particular compute node, of a particular compute sled, of a particular streaming array, of a particular rack assembly. Assignment may be performed based on knowledge of assets (e.g., games) that are available at the compute nodes. Previously, the client device is assigned general to a data center, without further assignment to rack assemblies. In this manner, the assigner 191 is able to assign a client device that is requesting execution of a particular gaming application that is compute intensive to a compute node that may not be running compute intensive applications. In addition, load management of assigning of compute intensive gaming applications as requested by clients may be performed at the assigner 191. For example, the same compute intensive gaming application that is being requested over a short period of time, may be spread across different compute nodes, of different compute sleds in one rack assembly or different rack assemblies to reduce load on a particular compute node, compute sled, and/or rack assembly.

In some embodiments, the assignment may be performed based on machine learning. In particular, resource demand may be predicted for a particular data center, and its corresponding resources. For example, if it can be predicted that a data center will soon be handling many clients running compute intensive gaming applications, then the assigner 191 may assign client device 110 with that knowledge, and assign resource that may not be currently utilizing all of its resource capabilities. In another case, assigner 191 may switch client device 110 from the game cloud system 190 in data center N to resources available in data center 3, in anticipation of increased loading at data center N. In addition, future clients may be assigned to resources in a distributed fashion, such that the load and demand for resources may be distributed throughout the game cloud system, across multiple data centers, across multiple rack assemblies, across multiple compute sleds, and/or across multiple compute nodes. For example, client device 110 may be assigned resources from both game cloud systems on data center N (e.g., over path 1) and data center 3 (e.g., over path 2).

Once the client device 110 is assigned to a particular compute node, of a corresponding compute sled, of a corresponding streaming array, the client device 110 connects to the corresponding data center through the network. That is, the client device 110 may be communicating with a different data center, such as data center 3, than the one performing assignment.

System 100 provides gaming via a game cloud system 190, wherein the game is being executed remote from client device (e.g. thin client) of a corresponding user that is playing the game, in accordance with one embodiment of the present disclosure. System 100 may provide gaming control to one or more users playing one or more games through the cloud game network or game cloud system 190 via network 150 in either single-player or multi-player modes. In some embodiments, the cloud game network or game cloud system 190 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include 5th Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the system 100 including game cloud system 190 can provide access to a plurality of gaming applications. In particular, each of the client devices may be requesting access to different gaming applications from the cloud game network. For example, the game cloud system 190 may provide one or more game servers that may be configured as one or more virtual machines executing on one or more hosts to execute a corresponding gaming application. For example, a game server may manage a virtual machine supporting a game processor that instantiates an instance of a gaming application for a user. As such, a plurality of game processors of one or more game servers associated with a plurality of virtual machines is configured to execute multiple instances of one or more gaming applications associated with gameplays of a plurality of users. In that manner, back-end server support provides streaming of media (e.g. video, audio, etc.) of gameplays of a plurality of gaming applications to a plurality of corresponding users. That is, a game server of the game cloud system 190 is configured to stream data (e.g. rendered images and/or frames of a corresponding gameplay) back to a corresponding client device through network 150. In that manner, a computationally complex gaming application may be executing at the back-end server in response to controller inputs received and forwarded by client device. Each server is able to render images and/or frames that are then encoded (e.g. compressed) and streamed to the corresponding client device for display.

In embodiments, each virtual machine defines a resource environment which can support an operating system, upon which a gaming application can be run. In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console so as to support gaming applications and/or video games designed for that gaming console. It should be appreciated that a variety of current and legacy gaming consoles can be emulated in a cloud-based gaming system. In this manner, a user can access game titles from different gaming consoles via the cloud-gaming system.

In one embodiment, cloud game network or game cloud system 190 is a distributed game server system and/or architecture. In particular, a distributed game engine executing game logic is configured as a corresponding instance of a corresponding gaming application. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network or game cloud system 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2A:
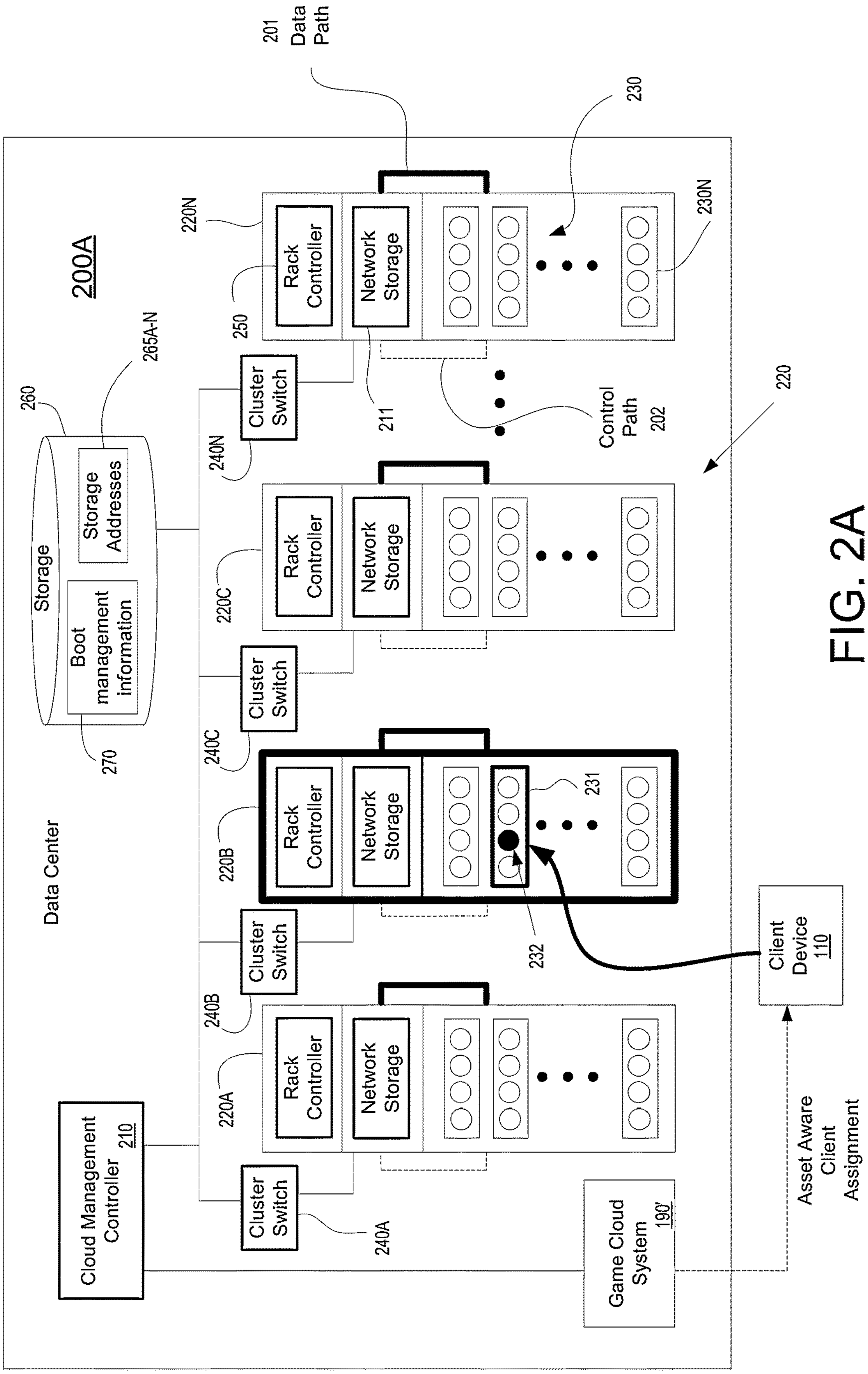
FIG. 2A is a diagram of a plurality of rack assemblies including a plurality of compute nodes at a representative data center of a game cloud system, in accordance with one embodiment of the present disclosure.

FIG. 2A is a diagram of a plurality of rack assemblies 210 including a plurality of compute nodes at a representative data center 200A of a game cloud system, in accordance with one embodiment of the present disclosure. For example, multiple data centers may be distributed throughout the world, such as in North America, Europe and Japan.

The data center 200 includes a plurality of rack assemblies 220 (e.g., rack assemblies 220A through 220N). Each of the rack assemblies includes corresponding network storage and a plurality of compute sleds. For example, representative rack assembly 220N includes network storage 211 and a plurality of compute sleds 230 (e.g., sleds 230A through 230N), and a rack controller 250 configured for internal and external network configuration of components the rack assembly 220N. Other rack assemblies may be similarly configured with or without modification. In particular, each of the compute sleds includes one or more compute nodes providing hardware resources (e.g., processors, CPUs, GPUs, etc.). For example, compute sled 230N in the plurality of compute sleds 230 of rack assembly 220N is shown to include four compute nodes, though it is understood that the rack assembly may include one or more compute nodes. Each rack assembly is coupled to a cluster switch that is configured to provide communication with a management server that is configured for management of the corresponding data center. For example, rack assembly 220N is coupled to cluster switch 240N. The cluster switch also provides communication to external communication networks (e.g., internet, etc.).

In particular, a cluster fabric (e.g., cluster switches, etc.) provides communications between rack assemblies in one or more clusters, distributed storage 270, and a communication network. In addition, the cluster fabric/switches also provide data center supports services, such as management, logging, monitoring, event generation, boot management information tracking, etc. Cluster fabric/switches may provide communication to an external communication network via a router system and a communication network (e.g., internet). Also, cluster fabric/switches provide communication to storage 270. A cluster of rack assemblies at a representative data center of a game cloud system may include one or more rack assemblies by design choice. In one embodiment, a cluster includes fifty rack assemblies. In other embodiments, a cluster may include more than or less than fifty rack assemblies.

In one network configuration, each rack assembly provides high speed access to corresponding network storage, such as within a rack assembly. In one embodiment, this high speed access is provided over a PCIe fabric which provides direct access between a compute node and the corresponding network storage. In other embodiments, high speed access is provided over other network fabric topologies and/or networking protocols, including Ethernet, Infiniband, remote direct memory access (RDMA) over Converged Ethernet (ROCE), etc. For example, in rack assembly 220N the high speed access is configured to provide a data path 201 between a particular compute node of a corresponding compute sled to a corresponding network storage (e.g., storage 211). In particular, the network fabric (e.g., PCIe fabric) is capable of providing greater than 4 Gigabyte per second (GB/s) network storage bandwidth (e.g., access) per compute node (e.g., of a rack assembly) at non-volatile memory express (NVMe) latencies. Also, a control path 202 is configured for communicating control and/or management information between the network storage 210 and each of the compute nodes.

In another network configuration (not shown), each rack assembly provides high speed access between compute nodes. For example, reconfiguration of a PCIe fabric within a rack assembly is performed to allow for high-speed communication between compute nodes internally within the rack assembly, such as when forming a super computer, or when forming an artificial intelligence (AI) computer.

As shown, the cloud management controller 210 and/or a corresponding rack controller (e.g., rack controller 220B) of the data center 200 communicates with the assigner 191 (shown in FIG. 1) to assign resources to client device 110. In particular, cloud management controller 210 and/or a corresponding rack controller (e.g., rack controller 220B) of the data center 200 may work with an instance of the game cloud system 190' and in conjunction with the initial instance of the game cloud system 190 (e.g., of FIG. 1) to assign resources to client device 110. That is, the assigner 191 may work with the cloud management controller 210 and/or the corresponding rack controller to assign users to resources. In one embodiment, the corresponding rack controller is largely responsible for bringing a rack assembly up to operation, including configuring the internal and external networking, powering on of compute sleds and/or compute nodes located within the corresponding rack controller, etc. The corresponding rack controller communicates status information up to the cloud management controller 210, such as how many working sleds are available for assignment, how many compute nodes are available for assignment, etc. This information may be communicated to the assigner 191 by the cloud management controller 210 and/or the corresponding rack controller, such that the information may be used by the assigner to assign users to resources (e.g., compute nodes, etc.). In some embodiments, a corresponding rack controller and network storage pair are configured on the same server (e.g., on network storage), whereas in other embodiments, the corresponding rack controller and network storage are configured on separate servers. In embodiments, the assignment is performed based on asset awareness, such as knowing what resources and bandwidth are required and that exist at the data center. As such, embodiments of the present disclosure are configured to assign client device 110 to a particular compute node 232 of a corresponding compute sled 231 of a corresponding rack assembly 220B, for illustration.

In one embodiment, the cloud management controller 210 in cooperation with corresponding rack controllers are configured to manage remote boot control of computing resources, such as a compute node of a corresponding compute sled of a corresponding streaking array in a corresponding rack assembly. In another embodiment, the cloud management controller 210 is configured to directly manage remote boot control of computing resources, such as a compute node of a sled server located within a streaming array of a rack assembly. That is, the cloud management controller 210 and/or a corresponding rack controller are configured to manage remote boot control of a computing resource. For example, the cloud management controller 210 and/or corresponding rack controllers manage booting files (e.g., BIOS firmware) used for start up and/or boot operations of compute nodes that may be located at storage addresses 265A-N of remote storage 260. In addition, the cloud management controller 210 and/or corresponding rack controllers may control boot management information 270 of each of the computing resources within the data center, including boot images (e.g., operating system images) of compute nodes within the data center. In that manner, compute resources (e.g., rack assemblies, compute sleds, compute nodes, etc.) of a data center may be reconfigured dynamically depending on how those resources are intended to be utilized (e.g., for gaming during peak user demand, for secondary uses during off times (e.g., performing system maintenance, performing AI modeling, executing applications by a super computer, etc.)

The streaming rack assemblies are centered around compute nodes, which run gaming applications, video games and/or stream the audio/video of a game session to a one or more clients. Further, within each rack assembly, game content may be stored on a storage server providing network storage. The network storage is equipped with a large amount of storage and high-speed networking to serve many compute nodes. In particular, a storage protocol (e.g., network file system, etc.) would be implemented over the network fabric topology used for accessing network storage. Data may be stored in network storage using file storage, block storage, or object storage techniques based, in part, on the underling storage protocol being implemented. For example, a PCIe fabric storage protocol may access block storage data from network storage.

Figure 2B:
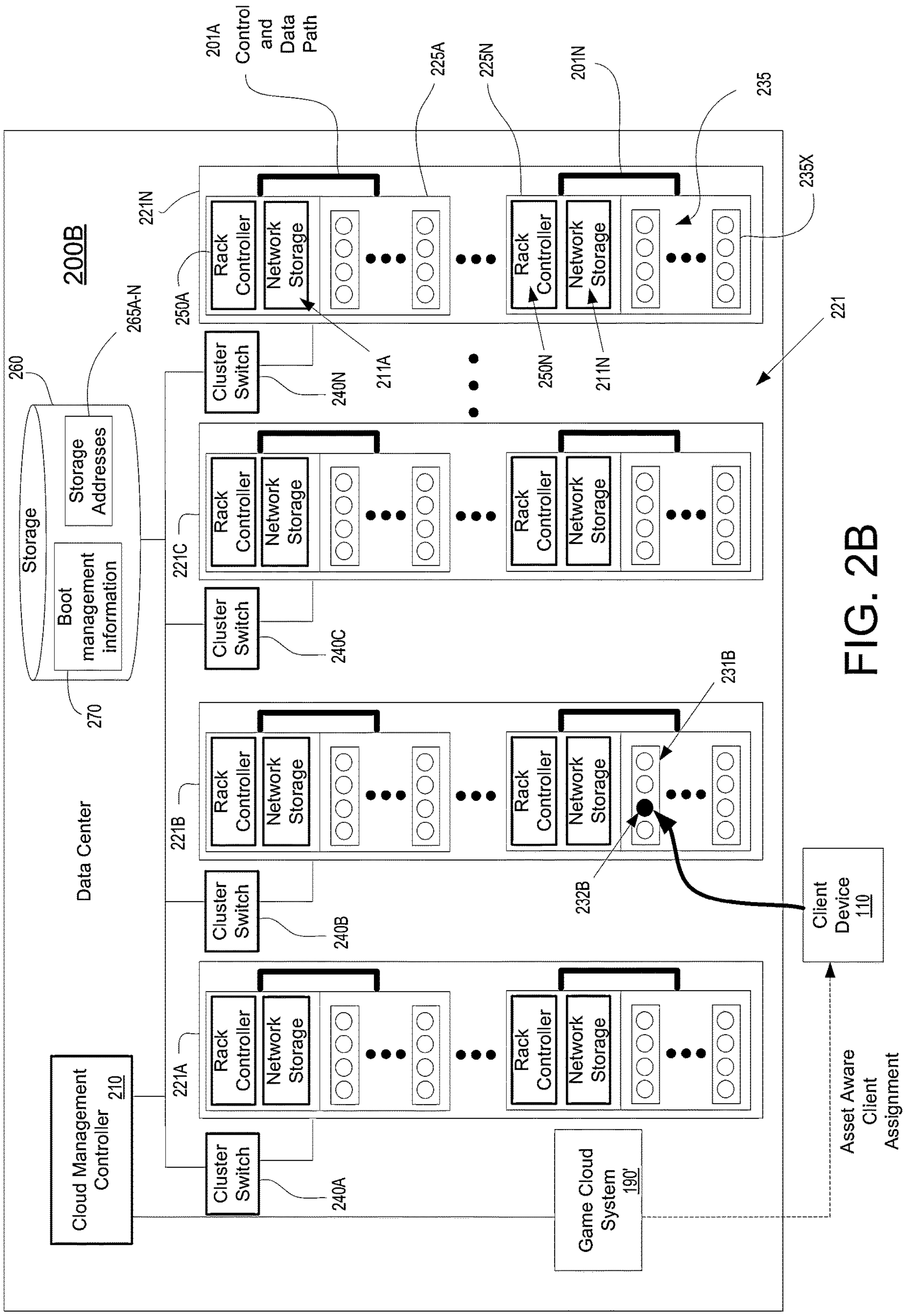
FIG. 2B is a diagram of a plurality of rack assemblies including a plurality of compute nodes at a representative data center of a game cloud system, wherein each network storage is accessible by a corresponding array of compute nodes, in accordance with one embodiment of the present disclosure.

FIG. 2B is a diagram of a plurality of rack assemblies 221 including a plurality of compute nodes at a representative data center 200B of a game cloud system, wherein each network storage is accessible by a corresponding array of compute nodes, in accordance with one embodiment of the present disclosure. Data center 200B is similar to data center 200A, wherein like numbered components have similar functionality. However, data center 200B has a different configuration of rack assemblies than the rack assemblies in data center 200A, such network storage is accessed by compute nodes of a single streaming array, as will be described below.

The data center 200B includes a plurality of rack assemblies 221 (e.g., rack assemblies 221A through 221N). Each of the rack assemblies includes one or more streaming arrays, wherein each streaming array includes a corresponding network storage and a plurality of compute sleds. For example, representative rack assembly 221N includes streaming arrays 225A through 225N. In one embodiment, rack assembly 221N includes two streaming arrays, wherein each streaming array includes network storage, a corresponding rack controller, and a plurality of compute sleds. For example, streaming array 225N includes a plurality of compute sleds 235 accessing a network storage 211N. In particular, each streaming array includes a corresponding rack controller and network storage. For example in representative rack assembly 221N, streaming array 225A includes rack controller 250A and network storage 211A, and streaming array 225N includes rack controller 250N and network storage 211N. In some embodiments, a corresponding rack controller and network storage pair of a corresponding streaming array are configured on the same server (e.g., on network storage), whereas in other embodiments, the corresponding rack controller and network storage are configured on separate servers. In still other embodiments, a rack assembly includes multiple streaming arrays each with a corresponding network storage, wherein a single rack controller for the rack assembly manages boot control (e.g., remote boot control, control boot management information, etc.) of computing resources across all of the streaming arrays. In still other embodiments, a rack assembly includes multiple streaming arrays that access a single network storage, wherein a single rack controller for the rack assembly manages boot control (e.g., remote boot control, control boot management information, etc.) of computing resources across all of the streaming arrays. As shown, each of the compute sleds includes one or more compute nodes providing hardware resources (e.g., processors, CPUs, GPUs, etc.). For example, compute sled 235X of streaming array 225N is shown to include four compute nodes, though it is understood that the rack assembly may include one or more compute nodes.

Each rack assembly is coupled via a corresponding rack controller to a cluster switch that is configured to provide communication with a cloud management controller 210 that is configured for management of the corresponding data center, as previously described. The corresponding rack controller provides for internal management of resources in a corresponding rack assembly, including handling internal details for resources in the corresponding rack assembly, including making sure that those resources start and stay in working order by performing management of compute nodes, compute sleds, streaming arrays, etc. For example, rack assembly 221N is coupled to cluster switch 240N. The cluster switch also provides communication to other rack assemblies (e.g., via corresponding cluster switches, and to external communication networks (e.g., internet, etc.).

In one network configuration, each streaming array of a corresponding rack assembly provides high speed access to corresponding network storage, as previously described. In one embodiment, this high speed access is provided over a PCIe fabric which provides direct access between a compute node and the corresponding network storage. In other embodiments, high speed access is provided over other network fabric topologies and/or networking protocols, including Ethernet, Infiniband, remote RDMA over RoCE, etc. Compute nodes may run gaming applications and stream the audio/video of a game session to one or more clients, wherein a corresponding network storage (e.g., storage server) holds the gaming application, game data, and user data. For example, in streaming array 225A of rack assembly 221N the high speed access is configured to provide a data and control path 201A between a particular compute node of a corresponding compute sled to corresponding network storage (e.g., storage 211A). Also, path 201N is configured for communicating control and/or management information between the network storage 211N and each of the compute nodes in streaming array 225N.

In another network configuration (not shown), each rack assembly provides high speed access between compute nodes. For example, reconfiguration of a PCIe fabric within a rack assembly is performed to allow for high-speed communication between compute nodes internally within the rack assembly, such as when forming a super computer, or when forming an artificial intelligence (AI) computer.

As previously described, cloud management controller 210 of data center 200B in cooperation with corresponding rack controllers of corresponding rack assemblies communicates with the assigner 191 to assign resources to client device 110 in support of game cloud system 190' and/or 190. In embodiments, the assignment is performed based on asset awareness, such as knowing what resources and bandwidth are required and that exist at the data center. As such, embodiments of the present disclosure are configured to assign client device 110 to a particular compute node 232B of a corresponding compute sled 231B of a corresponding streaming array of a rack assembly 221B, for illustration.

Figure 3:
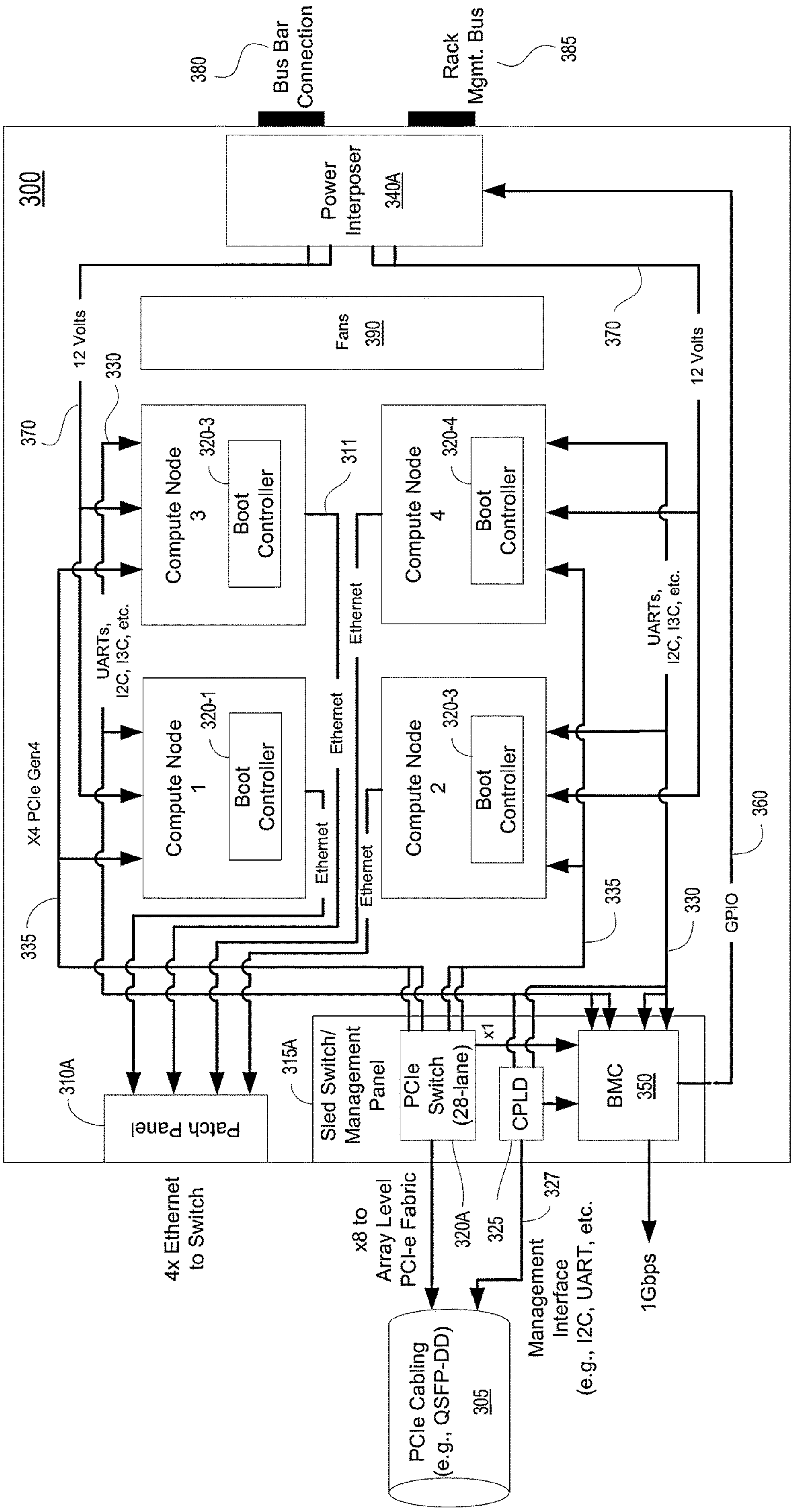
FIG. 3 is a diagram of a compute sled including a plurality of compute nodes located within a rack assembly configured for remote boot control of a compute node using a board management controller, in accordance with one embodiment of the present disclosure.

FIG. 3 is a diagram of a compute sled 300 including a plurality of compute nodes located within a rack assembly configured for remote boot control of a compute node and/or network reconfiguration of a corresponding rack assembly at the compute node level using a board management controller (e.g., via management control from a corresponding rack controller), in accordance with one embodiment of the present disclosure.

Each compute sled 300 includes one or more compute nodes (e.g., nodes 1-4) located within a corresponding rack assembly. Although FIG. 3 shows a compute sled including four compute nodes, it is understood that any number of compute nodes may be provided in a compute sled, including one or more compute nodes. The compute sled 300 may provide a hardware platform (e.g., circuit board) providing compute resources (e.g., through compute nodes). For example, the compute sled 300 shows a plurality of compute nodes (e.g., nodes 1-4) and auxiliary hardware to support operation of the compute nodes. The compute sled 300 may be implemented within any of the streaming arrays and/or rack assemblies previously introduced in FIGS. 2A-2B, or in any other rack assembly, streaming array, and/or data center configuration.

A sled switch/management panel 315A merges switching functionality provided by the PCIe switch board 320A and sled management functionalities provided, in part, through the board management controller (BMC) 350. For example, the PCIe switch board 320A provides communications with compute nodes, such as via NT ports. Also, BMC 350 may be connected directly to PCIe switch board 320A (e.g., over a 1× channel, etc.). As shown, panel 315A merges multiple functionalities in one embodiment, but in other embodiments those functionalities may be implemented separately on independent controllers.

In one network configuration, the compute sled 300 is configured to provide high speed access to network storage for compute nodes using PCIe (e.g., Gen 4-4th generation) communications, in accordance with one embodiment of the present disclosure. In other network configurations, the compute sled 300 is configured to provide high speed communication between compute nodes of compute sleds within a rack assembly, and with compute nodes between different rack assemblies. In one implementation, a compute node includes several I/O interfaces. For example, the compute node may include an M.2 port, and multiple lanes for PCIe Gen4 (bi-directional) over channels and/or connections 335. In particular, the compute sled 300 includes PCIe switch board 320A providing 8 PCIe lanes to the array-level PCIe fabric, such as over PCIe cabling 305 (e.g., quad form factor, double density—QSFP-DD, etc.). The PCIe (e.g., Gen4) interface (e.g., 4 lanes) can be used to expand the system with additional devices. In particular, the PCIe interface is used to connect to a PCIe fabric including the PCI Express switch 320A for high-speed storage.

In addition, each compute node is configured for Ethernet connections 311 (e.g., gigabit Ethernet) via Ethernet patch panel 310A, which is configured to connect Ethernet cables between compute nodes (e.g., nodes 1-4) and a rack level network switch (not shown).

Also, the board management controller (BMC) 350 is configured, in part, for managing one or more communication interfaces (e.g., PCIe, USB, UART, GPIO, I2C, I3C, etc.), each of which may be used for communicating with the compute nodes on compute sled 300 over corresponding communication channels (e.g., 330). That is, the BMC 350 is configured for managing a plurality of communication interfaces providing communication to the plurality of compute nodes (e.g., compute nodes 1-4) on the compute sled 300. For example, a corresponding compute node includes one or more universal asynchronous receiver transmitter (UART) connections that are configured for transmitting and/or receiving serial data. In particular, there may be one or more UART ports, which are meant for management purposes (e.g., connecting compute nodes with the BMC 350). Also, a port may be used for remote control operations such as "power on", "power off" and diagnostics. Further, another UART port may provide serial console capabilities.

Sled management of resources in compute sled 300 may be facilitated via one or more communication channels implementing a management interface utilized by the corresponding rack controller of the corresponding rack assembly. The management interface enables transmission of data packets to a variety of different devices within the compute sled 300, such as from the corresponding rack controller. The management interface may implement rack management (e.g., through execution of software), such as that provided by the rack controller, wherein the rack management software may be executing on the rack controller, or as implemented via network storage. The rack management software is executed to manage rack operations via the management interface, including powering on/off systems and resources on compute sled 300 (e.g., BMC 350, PCIe switch 320A, fans 390, power interposer board 340A, compute nodes 1-4, boot controllers on the compute nodes, etc.), performing firmware updates, obtaining sled status (e.g., temperatures, voltages, fan speeds, etc.), providing access to UART interfaces of individual compute nodes and/or BMC 350 (each of the compute nodes and/or BMC may have a UART or other interface/port, including I2C, I3C, etc.).

In particular, management control may be provided over the management interface from the corresponding rack controller via Ethernet connections 335, and/or through the PCIe cabling 305 as a primary implementation. For example, management interface 327 may be implemented as separate wires in the PCIe cabling 305 (e.g., two separate wires for sending and receiving) to be used or further transmitted over I2C, I3C, UART, or some other interface. In particular, in addition to Ethernet connections, the management interface may be provided via a low-speed interface (e.g., as implemented by the BMC 350) realized using either I2C, I3, UART, or other communication interfaces for transmitting control packets to devices within the compute sled 300. In that manner, management control over the management interface may be provided over Ethernet (i.e., as a first option), and/or provided over PCIe (i.e., as a second option) via the management interface 327 and/or I2C, I3, UART, or other communication interfaces.

In one embodiment, the management interface may be directly provided by or via the BMC 350, such as when receiving board management control signals from the PCIe cabling 305 via management interface 327, and delivered to the compute nodes through communication interfaces 330 (e.g., I2C, I3C, UARTs, etc.). For example, one PCIe lane may be reserved for communications with the BMC 350 for board management control. As previously described, BMC 350 is configured to manage communication interfaces for purposes of providing remote booting of compute nodes. In particular, the BMC 350 is configured to communicate with a corresponding compute node on the compute sled 300 for purposes of performing remote boot control of the compute node. For example, external hardware is used in a boot process of a compute node as handled by communications between the BMC 350 and the corresponding compute node, such that no storage is needed for storing boot configuration files on the compute node. This allows for flexibility in what software is used for external booting of the compute node. That is, the compute node may be configured with one operating system providing services falling under a first priority of services (e.g., primary services), and then later may be reconfigured with a second operating system providing services falling under a second priority of services (e.g., secondary services).

In another embodiment, the management interface may be provided by or via another helper chip, such as a complex programmable logic device (CPLD) 325, which manages communication over the management interface (i.e., manages transmission of data packets). Transmission through the CPLD 325 provides for a robust backup mechanism for delivering board management control signals throughout compute sled 300. For example, the backup mechanism may be implemented when Ethernet communications fails for whatever reason, or because the PCIe switch 320A fails, or when BMC 350 crashes (e.g., its firmware becomes corrupted). Under those conditions, the management interface 327 is configured to implement the backup mechanism for delivering board management control signals. In particular, the management interface 327 connects first CPLD 325, wherein CPLD 325 is also connected to BMC 350, or directly to I2C, I3, UART, or other communication interfaces (e.g., over channels 330). That is, the backup mechanism allows for bypassing the BMC 350, such that board management control signals from the rack controller are forwarded through the CPLD 325 for delivery over the channels 330. While the backup mechanism is very robust and reliable (i.e., CPLD 325 not subject to failure as it is implemented on dedicated hardware), the related performance may be limited in scope and/or speed. However, the backup mechanism provides for implementation of at least low-level operations (i.e., as programmed through the CPLD 325), including power control, reset operations, and collecting some limited diagnostics.

BMC 350 may provide board or sled management functionality. Further, board management provided by BMC 350 includes control, monitoring, and management of compute nodes, which is performed using universal asynchronous receive transmit (UART), I2C, I3C, etc. signals delivering serial data (e.g., power on/off, diagnostics, and logging information) over connections 330 for each compute node, in embodiments. In other embodiments, board management may be provided through other interfaces, such as through Ethernet (e.g., communicating directly with the rack controller). In addition, the BMC 350 may be configured to provide electromagnetic compatibility (EMC) control for controlling electromagnetic energy, and debug lagging using UART signals. BMC 350 may be configured to provide control status information, such as via control status light emitting diodes (LEDs) on a management panel 330A, which is further configured to give status using LEDs, and buttons. BMC 350 is configured to provide temperature and voltage monitoring. Also, BMC 350 is configured for managing fans configured for cooling. The BMC 350 is also configured for managing the Ethernet connection for board management.

The compute sled 300 includes a power interposer board 340A, which is configured to provide power to a corresponding compute sled through one or more bus bar connections. That is, BMC 350 may be configured to enable power control/delivery to compute nodes over the rack management bus 360 using general purpose input/output (GPIO), and/or I2C, and/or some other communication interface to a power interposer 340A (e.g., from 12 volt or higher bus bar to each compute node). In particular, the power management functionality is used to manage and/or monitor power delivery to each of the compute nodes through the power interposer board 340A through connection. For example, rack management bus 360 may be configured to provide sled management control signals. Power monitoring (e.g., sensors connected over an I2C channel for measuring current, voltage, and other conditions over a power connection to a compute node) may be performed and communicated over the rack management bus 360, such as to BMC 350. The BMC 350 in cooperation with a corresponding rack controller may decide to turn power off for individual components (e.g., compute nodes, etc.) or to the entire compute sled under certain conditions, including for example, when detecting too high of voltage, detecting too high of temperature, detecting when fans 390 on the compute sled 300 are inoperable, and other bad conditions. In particular, the BMC 350 provides management information (e.g., power conditions, etc.) to the corresponding rack controller to provide sled management instructions. The BMC 350 can act independently of the rack controller under certain extreme conditions, but generally works cooperatively with the rack controller for sled management. For example, sled management is performed externally (e.g., via rack controller) and communicated internally through a rack management bus 360, including when disabling sleds under various conditions, for example during expected maintenance of the rack assembly, power loss at the corresponding data center due to fire in the data center, or implementation of back-up power, etc. Each compute node also includes a power input connector (e.g., 12 volts for designed power consumption) connected to power interposer 340A through a corresponding bus bar 370 connection.

Figure 4:
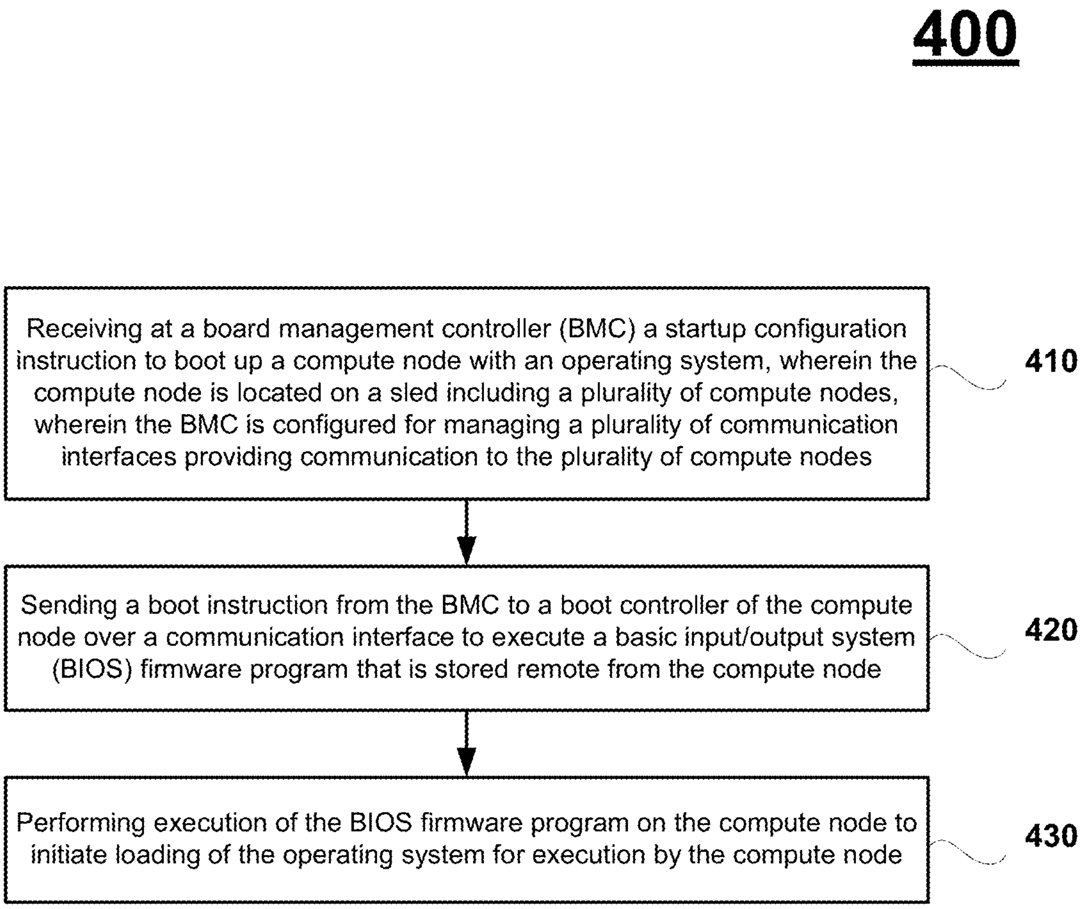
FIG. 4 is a flow diagram illustrating steps in a method for performing remote booting of a compute node with a board management controller, in accordance with one embodiment of the present disclosure.

FIG. 4 is a flow diagram 400 illustrating steps in a method for performing remote booting and/or remote starting of a computing resource, in accordance with one embodiment of the present disclosure. For example, flow diagram 400 may be implemented to perform remote booting of a compute node of a compute sled including one or more compute nodes using a board management controller (BMC) of the compute sled and a corresponding boot controller of the compute node (e.g., boot controller 320-1 of compute node 1, or boot controller 320-2 of compute node 2, or boot controller 320-3 of compute node 3, or boot controller 320-4 of compute node 4 in compute sled 300 of FIG. 3). In particular, external hardware is used in a boot process of a compute node, such that no storage is needed for booting an OS, which allows flexibility in what software is used for external booting, in one embodiment. In other embodiments, there may be storage on the compute node configured, in part, for booting an OS. Although flow diagram 400 is described in relation to remote booting of compute node of a compute sled configured within a streaming array of a rack assembly located within a cluster of rack assemblies of a data center, such as the data centers of FIGS. 2A-2B, it is understood that the operations described in flow diagram 400 may be generally applied for remote booting of any computing resource using external hardware for storing booting files (e.g., BIOS, operating system configuration files, etc.).

Traditionally, system start up may perform one or more processes to initialize hardware and load an operating system used for executing applications by the computer system. In general, a computer system typically loads and executes a basic input/output system (BIOS) firmware from read only non-volatile memory (e.g., electrically erasable programmable read-only memory—EEPROM, Flash memory, etc.) located on the computer system to initialize the hardware of the computer system at system startup. Once the hardware is initialized, the BIOS firmware is used to boot an operating system from a local storage device, such as a hard drive or a solid state drive (SSD), such as when executing one or more boot loader programs as directed by the BIOS firmware. Because the BIOS firmware used for loading an operating system is located in read only memory, any operating system change would require changing the BIOS firmware on the local system and/or changing settings that may be stored in local volatile memory (may be configured with a battery source), which is difficult to accomplish in a sufficient amount of time to satisfy real-time demands of clients and/or users.

Embodiments of the present disclosure provide for remote booting of a compute node of a compute sled (e.g., game console) in which there is no built-in storage used for booting on the platform (compute node) and no BIOS. In some embodiment, optionally there may be minimal storage for the boot controller (located internally to the boot controller or externally to the boot controller), whereas in other embodiments there is not storage for the boot controller. That is, remote booting includes swapping BIOS implementations, and correspondingly swapping OS implementations. For example, the compute node may be configured for gaming using back-end streaming servers of a cloud gaming system, wherein the compute node is located on a compute sled of a streaming array including a plurality of compute sleds. The streaming array is located on a rack assembly of a data center including a plurality of clustered rack assemblies, wherein each rack assembly includes one or more network storages and one or more streaming arrays. External hardware is used in the boot process, such that no storage is needed (e.g., reduces cost for each compute node with less hardware), such as non-volatile memory for storing the BIOS firmware and/or other boot configuration files. The compute node may be configured with volatile memory, such as random access memory (RAM) used during operation of the compute node (e.g., to run the operating system, applications, etc.). In this manner, the remote booting of a compute node provides for flexibility in what software (e.g., selecting between multiple BIOS firmware) to boot externally, thereby providing for flexible loading of a desired operating system for use to execute application on the compute node. For example, when the compute node is configured for gaming, an operating system suitable for gaming is loaded for execution of gaming applications on the compute node (e.g., possibly without the use of a BIOS). On the other hand, the compute node may be configured for services other than gaming that require a different operating system. In that case, the compute node may be configured to load the new operating system using the remote boot process for execution of other applications providing those services other than gaming on the compute node. The required BIOS firmware needed between gaming and non-gaming use cases are very different. The non-gaming use case transforms the compute node and/or system into more of a personal computer (PC), which runs a typical or standard OS. In this case, the BIOS may be stored locally in non-volatile memory (e.g., SSD, etc.). On the other hand, the gaming use case is more specific, and does not necessarily need a classic BIOS firmware. For example, some features associated with the BIOS firmware (e.g., functions performed normally by BIOS to implement an OS for a PC) are unnecessary in the gaming use case, and BIOS functionality to implement a gaming console may be performed by the gaming OS itself during loading without use of dedicated BIOS firmware.

In particular, at 410, the method includes receiving at a board management controller (e.g., BMC 350 of compute sled 300 in FIG. 3) of a compute sled a startup configuration instruction (from the cloud management controller) to boot up a compute node with an operating system. The instruction may be delivered to the BMC by a cloud management controller via a corresponding rack controller. The cloud management controller may be configured for managing remote booting of compute nodes in the data center in cooperation with corresponding rack controllers, and for collecting information related to the booting of the compute nodes, such as storing boot images for each of the compute nodes, etc. More particularly, the BMC of a corresponding compute sled is configured for managing a plurality of communication interfaces providing communication to the plurality of compute nodes. For example, the communication interfaces may include inter-integrated circuit (I2C) bus interface (e.g., providing communications using PCI, PCIe, etc.), I3C, or PCI, or PCIe, or UART, or USB, etc.

In particular, the BMC uses one or more of these communication interfaces to communicate with a boot controller within a compute node. In one implementation, the BMC may be configured on a system on chip (SoC), which includes a central processing unit-CPU—and other components. The BMC would run a corresponding OS and/or firmware, which may be loaded from non-volatile memory (e.g., flash, ROM, etc.) located on the integrated circuit of the SoC, wherein the OS of the BMC requires managing and/or updating. While the BMC could provide the management and updating functionality, management of the BMC may be provided through a side channel, such as using the management interface previously introduced in relation to FIG. 3. As such, the management interface may be used to manage and update the OS and/or firmware, and also perform other operations on the BMC, previously described, including performing power on/off, power reset, and others. Also, the boot controller on the compute node may require firmware to function, which may be loaded through various methods depending on hardware design. For instance, the boot controller may have its firmware integrated into a small sized ROM located on the motherboard of the corresponding compute node, in one embodiment. In another embodiment, the boot controller firmware may be loaded remotely through the BMC on the corresponding compute sled, wherein the BMC pushes the boot controller firmware through a low-level interface via channels 330 (e.g., I2C, UART, serial peripheral interface—SPI—, etc.).

This boot controller may be configured to load the BIOS firmware on the main CPU of the compute node (e.g., RAM or system memory used by the CPU) following the boot instruction. More particularly, in embodiments of the present disclosure the BMC is configured to provide the boot controller with instructions to load the BIOS and operating system from one or more remote locations, wherein the instructions are provided over PCIe, USB, UART or another interface, and the BIOS firmware may be accessed over a PCIe fabric. In addition to triggering the boot process, the BMC may perform other operations that enable the return of information about the motherboard of the compute node and/or boot controller. For example, board information could include board type, board version, serial number. Board information could also include CPU information for the compute node, including model number, serial number, hardware encryption keys, and other information. This board information can be used to verify compatibility between the BIOS or operating system to be booted onto the corresponding compute node. In another implementation, it may be that the BIOS or operating system is locked to a particular compute node system (e.g., by means of encryption).

In particular, at 420, the method includes sending a boot instruction from the BMC to a boot controller of the compute node over a selected communication interface to execute a BIOS firmware that is stored remote from the compute node. That is, the BIOS firmware is stored in external hardware (i.e., external from the compute node). For example, the BIOS firmware may be stored on memory of the BMC (memory on BMC chip), or may be stored on remote storage of the corresponding rack assembly, or may be stored on storage that is remote from the corresponding rack assembly (e.g., remote storage accessible by one or more rack assemblies of the data center, such as storage addresses 260A-N of FIGS. 2A-2B).

In one embodiment, a pull method is implemented to accessing the BIOS firmware that is located external from the compute node. In particular, the pull method includes receiving at the BMC from the compute node a request to access a storage address storing the BIOS firmware. That is, the storage address of the BIOS firmware is known to the corresponding rack controller, and further the storage address is included in the startup configuration instruction provided to the BMC by the rack controller, and wherein the storage address is included within the boot instruction delivered from the BMC to the compute node. The pull method further includes facilitating access to the storage address by the compute node to retrieve the BIOS firmware. That is, the BMC forwards the request over the appropriate network in order to provide access and delivery of the BIOS firmware back to the compute node. While the corresponding rack controller is aware of internal details necessary for remote boot control of the corresponding compute node, the overlying cloud management controller may provide high level instructions, such as moving sleds and/or rack assemblies from one mode to another mode of operation. In that manner, specific compute node management may be performed at the rack assembly level.

In another embodiment, a push method is implemented to accessing the BIOS firmware that is located external from the compute node. In particular, the push method includes accessing by the BMC the BIOS firmware at a storage address that is external from the compute node. That is, the storage address of the BIOS firmware is known to the corresponding rack controller, and further the storage address is included in the startup configuration instruction provided to the BMC by the rack controller. In that manner, the BIOS firmware is accessible by the BMC from the storage address. The push method further includes sending the BIOS firmware from the BMC to the compute node in association with the boot instruction for the execution of the BIOS firmware by the compute node. For example, the BIOS firmware may be included in the boot instruction. In that manner, the compute node does not require additional steps for accessing the BIOS firmware.

In one embodiment, the communication interface is selected based on the operating system that is initialized and loaded through execution of the BIOS firmware. For example, each of the operating systems may be associated with a corresponding communication interface. Control signals for each of the operating are delivered over the corresponding communication interface to the compute node. As an illustration, control signals for a first operating system are delivered over a first communication interface (I2C), and control signals for a second operating system are delivered over a second communication interface (e.g., UART), and control signals for a third operating system are delivered over a third communication interface (e.g., USB), etc. In that manner, based on the operating system, the boot instruction from the delivered from the BMC to a boot controller of the compute node is delivered over the corresponding communication interface managed by the BMC used for communicating control signals for that operating system. As such, the BMC may be configured as a switch to deliver control signals for each of a plurality of operating systems loadable by the compute node over a corresponding communication interface taken from the plurality of communication interfaces managed by the BMC. That is, the BMC sled switch board provides communication interfaces to compute nodes, such as PCI, PCIe, I2C, UART, USB, etc.

At 430, the method includes performing execution of the BIOS firmware on the compute node (CPU) to initiate loading of the operating system for execution by the compute node. As previously described, the execution of the BIOS firmware (e.g., first stage bootloader) may include execution of other related firmware and/or software or programs (e.g., second stage boot loader(s)) to finish the loading the operating system for use by the compute node. That is, in one case the BIOS firmware may be complete and not require any additional firmware and/or software or programs to finish the loading the of the operating system, and in other cases the BIOS firmware may be used to call and/or execute other firmware and/or software or programs.

For purposes of illustration only, execution of the BIOS firmware may include initialization of system hardware and the loading of the operating system. In particular, the BIOS firmware may perform a power-on self test (POST) process to initialize the system hardware (e.g., video card and other hardware devices), perform a memory test and set memory and drive parameters), set Plug & Play devices, identify any boot device for loading subsequent boot loaders (e.g., second stage, etc.) that are executed to loading the operating system (e.g., operating system configuration files).

Further, the method includes loading at least a portion of the operating system from a storage address into system memory (e.g., RAM) of the compute node, wherein the storage address includes one or more operating system configuration files). In one implementation, the entire operating system may be loaded to system memory. However, some operating systems may be overly large, and it is more efficient to load some portions of the operating system to system memory, and have remaining portions available for use and/or loading when needed. For example, a first portion of the operating system is loaded into system memory of the compute node for execution. Also, a second portion of the operating system may be stored in a corresponding network storage for access by the compute node (e.g., over a PCIe fabric) during execution of the operating system by the compute node. For instance, data and/or files in the second portion may be accessed and loaded into system memory as needed, or may be remotely accessed during execution of the operating system.

In another embodiment, the cloud management controller in cooperation with a corresponding rack controller are configured for managing one or more images of the operating system executing on the compute node. That is, the cloud management controller of the data center and/or corresponding rack controllers are configured to manage software images (e.g., operating system images) for each compute node. In that manner, the cloud management controller and/or corresponding rack controllers manage the operating systems executing on the various compute nodes and rack assemblies available within the data center. For example, the management information may be stored in storage 260 of FIG. 2A or 2B.

In one embodiment, during changeover of operating systems of a compute node, a job or multiple jobs executing on the compute node prior to the changeover may be suspended and/or transferred for continued execution. For example, a job may be performed by the compute node executing an application using a first operating system that is different than the new operating system being loaded through remote booting. For purposes of illustration, the job may be in association with a gaming application, wherein the gaming application may be suspended to be started at a later time, or transferred to another compute node for seamless transfer and execution. For example, a state (e.g., configuration) of a compute node during execution of the job is captured and stored. The state is transferred to another compute node, such as on the same compute sled, or on the same streaming array, or one the same rack assembly, or on a compute node of a different rack assembly in the same data center, or on a compute node of a different data center. The state is initialized in the other compute node, and the application is then executed on the new compute node using the transferred state in order to resume the job. In one implementation, the job being suspended is suspended at a selected pause or suspend point that is not a predefined suspension point, such as an end of level of a gaming application.

The alternative jobs being run on the compute nodes during dark time utilization of compute nodes (e.g., enabled through remote booting) may also be suspended and/or transferred over to a different data center for continued execution, such as transferred to a data center with low utilization, or to portions of the same data center experiencing low utilization. For example, these alternative jobs may include machine learning workloads, or some other type of CPU/GPU workloads, or video encoding workloads, etc. In various implementations, the decision on whether to pause and/or transfer these alternative jobs may depend on what type of business model is implemented or chosen for these alternative workloads. Some cost effective jobs purchased by customers may be implemented through buying a certain amount of compute hours (i.e., without including any transfer) and may execute over different dark time periods. Other customers may pay for a certain number of jobs to be completed during a period (e.g., dark time period, extending beyond a dark time period), and may require suspension and transfer from one resource to another. Other scenarios may occur, such as pausing a job without transferring when a higher paying job needs servicing. In that manner, embodiments of the present disclosure support suspension and transfer of jobs under various scenarios.

A big difference between gaming use cases and dark time utilization cases (i.e., executing alternative jobs) is their scale. In particular, a gaming workload typically involves a single user occupying a single compute node, wherein multiple compute nodes support multiple users in a one-to-one relationship. For dark time utilization use cases, the single user may be an organization, for example, and as such would require use of many server racks or rack assemblies, if not an entire data center in some cases. For security reasons, resources are allocated for these dark time utilization use cases for the organization user on a rack assembly by rack assembly basis (e.g., rack controller and network storage) to keep those resources assigned for dark time utilization for that organization isolated from other customers. This may also involve putting those resources in different networks with different firewall rules, etc. which requires reconfiguration of those resources. This may also involve providing those resources with additional network access, such as access to different computer networks of the customer or requesting organization or of a different organization, such as for accessing data.

Purely for illustration purposes only, the suspended job may be associated with a game, or video game or gaming application. In particular, an on-going game is paused at any point in the game, and the game is resumed at the same point of the game at some time in the future (e.g., immediately upon transfer, or at a later time). The game state of the game and the configuration parameters of the compute node while executing the game are captured and saved. That is, the paused game state is saved with data sufficient to reconstruct the state of the game upon resuming the game. as such, while the game is paused, the game state is collected and saved to storage, such that the cloud gaming system does not need to store the state in active memory or registers of the hardware. This enables freeing up the system for other game play or providing other services (e.g., dark time utilization of compute nodes) for the compute node, and allows for resumption of the game play at any time and form any remote compute node (e.g., client). When resuming the game, the game state is loaded on the new compute node tasked to resume the game (e.g., same or different compute node). Loading of game state may include generating the game state from multiple saved files and data structures, such as that the reconstructed game state will place the compute node in the same or substantially the same state as when the game was paused.

For example, the cloud gaming system may include a cloud management controller, rack controllers, storage, and multiple compute nodes managed by the cloud gaming system and coupled over a network. Each of the compute nodes configured as a game console may include a hardware layer, an operating system layer and an application layer. The operating system layer is configured for interacting with the hardware layer, the operating system layer including a state manager. The application layer being configured for instructing with at least a portion of the operating system and a portion of the hardware layer. The application layer including a game, wherein the state manager is configured to capture game state data of the compute node and store the captured game state data when the game is paused. The state manager is also configured to apply the game state data on the same or different compute node in order to resume the game at the point the game was paused.

Figure 5:
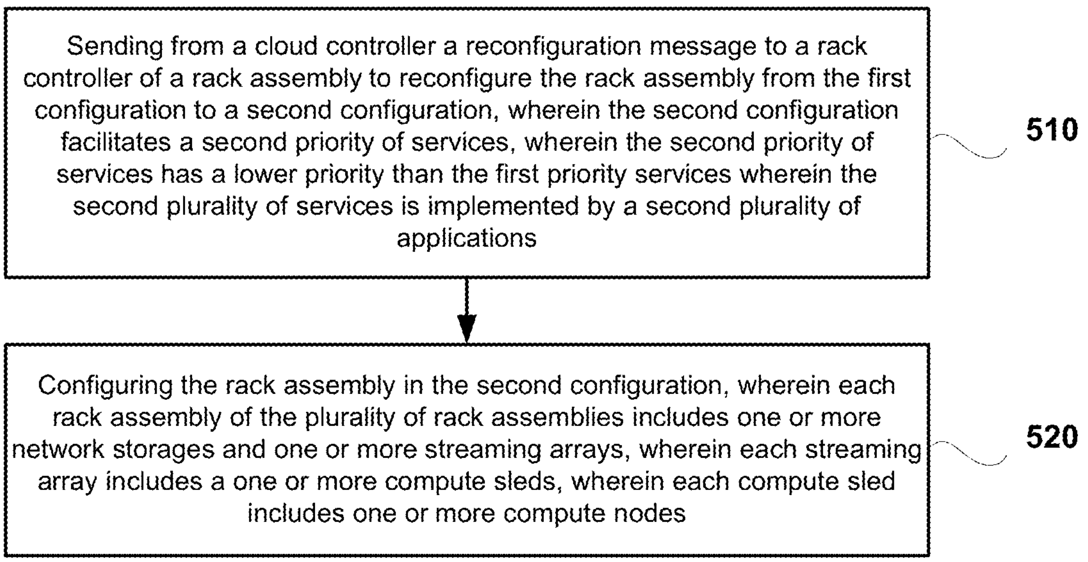
FIG. 5 is a flow diagram illustrating steps in a method for reconfiguration of rack assemblies of a data center, in accordance with one embodiment of the present disclosure.

FIG. 5 is a flow diagram 500 illustrating steps in a method for reconfiguration of rack assemblies of a data center, in accordance with one embodiment of the present disclosure. Flow diagram 500 may be implemented within the data storage systems shows in FIGS. 2A-2B. In particular, flow diagram may be implemented to provide for rack assembly reconfiguration at any suitable point in time.

For example, rack assembly reconfiguration may be performed to enable utilization of computing resources during dark time for a cloud gaming system primarily configured for gaming. That is, there are periods low activity or inactivity (i.e., dark time) when the computing resources are underutilized in a particular geographic region serviced by a regional data center, such as during work or school hours, or periods of intense social gathering (e.g., during a regional football game), or late night or early morning when users are not playing games on the cloud gaming system (e.g., sleeping hours). Embodiments of the present disclosure provide for utilization of the computing resources during those dark times or periods. In that manner, monetization of computing resources during these dark times is important for cost reasons (i.e., improve net income for each computing resource over a 24 hour period).

As such, one or more rack assemblies of a data center may be repurposed for handling different workloads other than gaming during a dark time. In general, it is more efficient to convert all the compute nodes of a corresponding rack assembly to perform similar tasks, such as those performed during dark times, and may require a network reconfiguration of the rack assembly to accomplish those tasks. Because all the compute nodes may be newly configured to handle the new tasks to be performed during dark times, the rack assembly reconfiguration would not adversely affect any compute node that may be performing tasks (e.g., gaming) under a previous network configuration for that rack assembly. That is, compute nodes handling games may be transferred to other rack assemblies of the same or a different data center, as previously described.

At 510, the method includes sending from a cloud management controller a reconfiguration message to a rack controller of a rack assembly to reconfigure the rack assembly from a first configuration to a second configuration. Other resources in the data center may get reconfigured as well including resources outside of a cloud gaming rack assembly. In particular, some use cases may need network/internet connectivity to other networks at third party cloud hosting companies (e.g., AWS cloud computing), or other networks. That connectivity may be established as part of the network configuration. In other cases, for security purposes reconfiguration of resources in the data center may be performed to isolate and/or prevent harmful workloads (e.g. from hackers, or external companies requesting services, or non-trusted customers) from negatively impacting in some way the overall functionality and integrity of the data center (e.g., primarily providing a cloud gaming service). As an illustration, reconfiguration may be utilized to combat a distributed denial of service (DDOS) or some hack experienced by certain portions of one or more data centers by an external party or by non-trusted customers. In the first configuration, the rack assembly is configured to facilitate a first priority of services implemented by a first plurality of applications (e.g., gaming). In the second configuration, the rack assembly is configured to facilitate a second priority of services implemented by a second plurality of applications (e.g., performing artificial intelligence or AI services). The second priority of services (e.g., AI) may have a lower priority than the first priority of services (gaming), such that the rack assembly is managed primarily to support gaming, but when demand for gaming is reduced (i.e., dark times), the rack assembly may be configured to handle the second priority of services thereby making the computing resources more utilized throughout an entire 24 hours period.

In one implementation, the rack assembly includes one or more network storages and one or more streaming arrays, as previously described in FIGS. 2A-2B. Each of the streaming arrays includes one or more compute sleds, wherein each compute sled includes one or more compute nodes.

The rack assembly may be sent the reconfiguration message when it is deemed appropriate to switch to a different configuration. For example, reconfiguration of one or more rack assemblies may occur at a particular defined time (e.g., after 2 am marking the beginning of dark time), or by predicted usage of computing resources of a data center that predicts when dark time will occur, and others. In one implementation, dark time is measured through metrics, wherein the cloud management controller is configured to detect declining demand for the first priority of services supported by a data center including a plurality of rack assemblies. For example, each of the plurality of rack assemblies is configured in the first configuration that facilitates the first priority of services (e.g., gaming).

Generally, switching a rack assembly to a different configuration may happen during dark time. However, there may be periods that are outside of a dark time where it may be beneficial to perform rack assembly reconfiguration. For example, if the second priority of services (e.g., a non-gaming workload) generates more income than the first priority of services (e.g., gaming), then a reverse priority may occur, in which case, the second priority of services is prioritized over the second priority of services (e.g., gaming). That is, the data center may deprioritize the first priority of services (e.g., gaming).

In one implementation, the cloud management controller manages network configurations of the plurality of rack assemblies. For example, the cloud management controller may keep an inventory of the number of rack assemblies, and the number of compute nodes that are configured for or are available for gaming (e.g., the first priority of services), such as in a particular geographic region. In that manner, as demand for gaming is reduced over a particular period of time that indicates that dark time is beginning, the cloud management controller may reconfigure one or more rack assemblies to support the second priority of services over gaming, while still maintaining sufficient numbers of rack assemblies to support the current and predicted demand for gaming by users of the data center.

At 520, the method includes configuring the rack assembly in the second configuration. In that manner, the rack assembly can execute applications that support the second priority of services (e.g., AI), thereby utilizing compute nodes that otherwise would sit idle.

In one embodiment, reconfiguration of a rack assembly may include rebooting compute nodes of the rack assembly into a different operating system. Generally, it may be beneficial to have compute nodes of a rack assembly running the same operating system, and further running the same version of the same operating system. For example, the different operating system may be better configured to support execution of the second priority of services (e.g., for execution of applications during dark time). Rebooting of a compute node includes operations previously described in FIG. 4, and may include receiving at a BMC a startup configuration instruction to boot up the compute node with the new operating system. The compute node is located on a sled including one or more compute nodes, and the BMC is configured for managing a plurality of communication interfaces providing communication to the compute nodes. The rebooting process may include sending a boot instruction from the BMC to a boot controller of the compute node over a communication interface to execute a basic input/output system (BIOS) firmware. The rebooting process may include executing the BIOS firmware on the compute node to load the operating system for execution by the compute node.

In one embodiment, reconfiguration of a rack assembly including the rebooting of compute nodes of the rack assembly into a different operating system may include loading new operating system software or other software components onto corresponding network storage of the rack assembly, or onto the cloud management controller or other storage accessible by the cloud management controller.

In one embodiment, reconfiguration of a rack assembly may include changing a network configuration of the rack assembly. That is, reconfiguration of the network configuration of the rack assembly is necessary to provide for communication between the rack assembly and a remote rack assembly, wherein the network configuration defines communication paths between the rack assembly and the another rack assembly. For example, external access of compute nodes using virtual local area networks may need to be reconfigured, and correspondingly firewalls may need to be reconfigured to provide suitable access to other remote rack assemblies (e.g., compute nodes located on a remote rack assembly). As previously described, resources in the data center may get reconfigured during network configuration to include access to resources outside of a cloud gaming rack assembly, such as providing network/internet connectivity to other networks at third party cloud hosting companies (e.g., AWS cloud computing), or other networks. Also, resource reconfiguration may be performed for security purposes, such as when isolating and/or preventing harmful workloads (e.g. DDOS, hacking workloads, or non-trusted external companies requesting services, or non-trusted customers) from negatively impacting in some way the overall functionality and integrity of the data center (e.g., primarily providing a cloud gaming service).

In one embodiment, reconfiguration of a rack assembly may include changing a boot storage architecture. For example, network reconfiguration may provide for high speed access to boot files or operating system files for use during booting and/or execution of the corresponding operating system.

In one embodiment, reconfiguration of a rack assembly may include reconfiguration of a PCIe fabric (or equivalent) fabric to allow high-speed communication between compute nodes to form a "super computer" or AI computer, wherein high speed compute node to compute node communication is required. For example, a rack assembly may be configured initially for direct access between the plurality of compute nodes and at least one network storage of the rack assembly, such as for implementing during gaming. However, during dark time, the rack assembly may be reconfigured in a second configuration. For example, the second configuration may configure a PCIe fabric for direct communication between a plurality of compute nodes in the rack assembly, instead of providing direct access to network storage (e.g., in the first configuration). In that manner, in the second configuration, the PCIe fabric facilitates direct communication between a first compute node and a second compute node in the rack assembly. In addition, rack reconfiguration may be performed to establish special network configurations between rack assemblies. Normally, cloud gaming rack assemblies act independently from each other; however, for some use cases two or more rack assemblies can be interconnected through reconfiguration to work together. Normally, firewalls and/or network settings, such as at cluster level switches, prevent such cooperation without reconfiguration.

Figure 6:
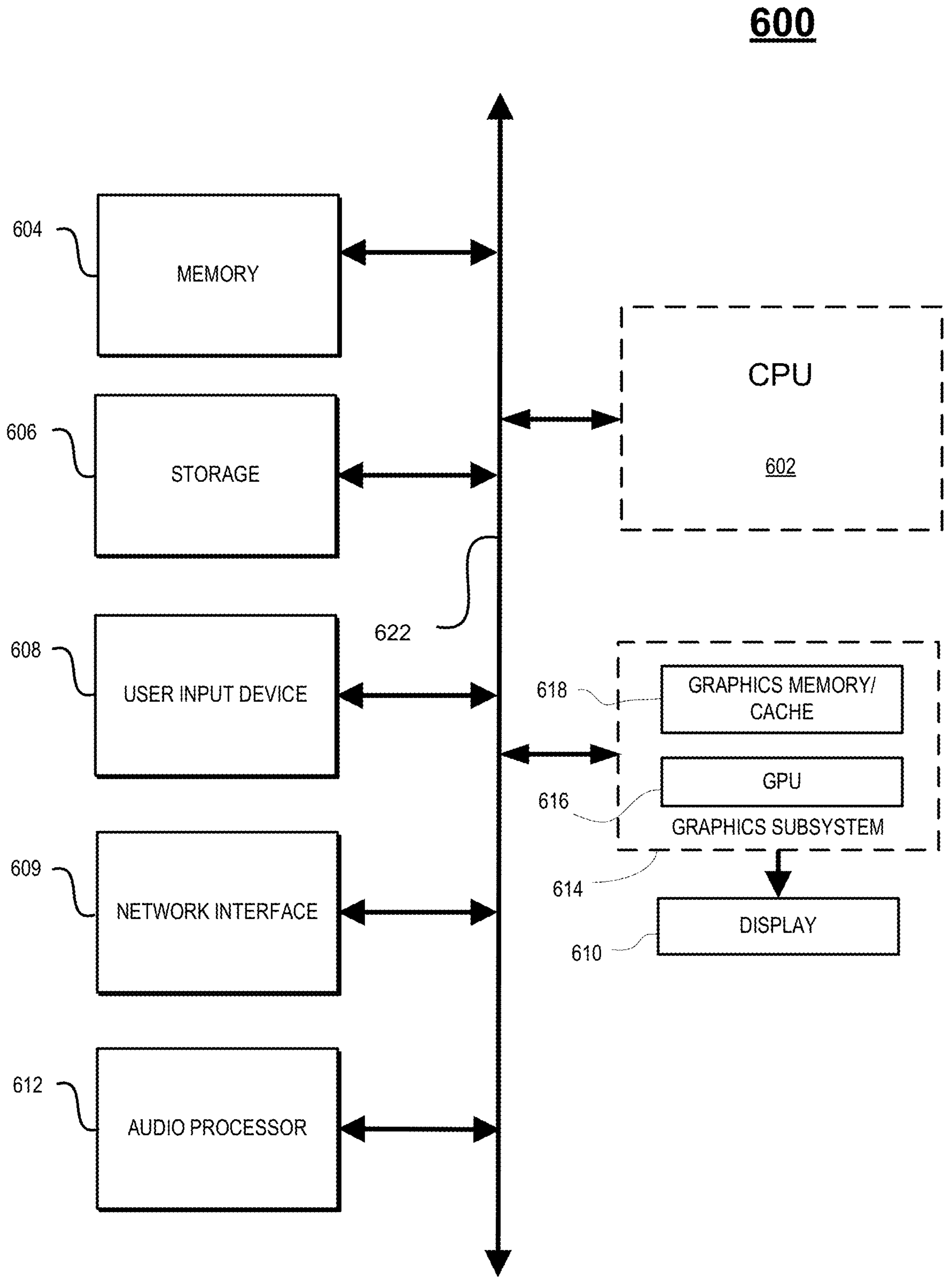
FIG. 6 illustrates components of an example device that can be used to perform aspects of the various embodiments of the present disclosure.

FIG. 6 illustrates components of an example device 600 that can be used to perform aspects of the various embodiments of the present disclosure. For example, FIG. 6 illustrates an exemplary hardware system suitable for providing remote boot control of a compute node, such as a compute node of a compute sled of a streaming array of a rack assembly, and network reconfiguration of rack assemblies of a data center, in accordance with embodiments of the present disclosure. This block diagram illustrates a device 600 that can incorporate or can be a personal computer, a server computer, gaming console, mobile device, or other digital device, each of which is suitable for practicing an embodiment of the invention. Device 600 includes a central processing unit (CPU) 602 for running software applications and optionally an operating system. CPU 602 may be comprised of one or more homogeneous or heterogeneous processing cores.

In accordance with various embodiments, CPU 602 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 604 stores applications and data for use by the CPU 602 and GPU 616. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, and/or microphones. Network interface 609 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, graphics subsystem including GPU 616, memory 604, data storage 606, user input devices 608, network interface 609, and audio processor 612 are connected via one or more data buses 622.

A graphics subsystem 614 is further connected with data bus 622 and the components of the device 600. The graphics subsystem 614 includes at least one graphics processing unit (GPU) 616 and graphics memory 618. Graphics memory 618 includes a display memory (e.g. a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610, or to be projected by a projection system (not shown). Display device 610 can be any device capable of displaying visual information in response to a signal from the device 600, including CRT, LCD, plasma, and OLED displays. Device 600 can provide the display device 610 with an analog or digital signal, for example.

In other embodiments, the graphics subsystem 614 includes multiple GPU devices, which are combined to perform graphics processing for a single application that is executing on a corresponding CPU. For example, the multiple GPUs can perform multi-GPU rendering of geometry for an application by pretesting the geometry against screen regions, which may be interleaved, before rendering objects for an image frame. In other examples, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for providing remote boot control of a compute node and network reconfiguration of rack assemblies of a data center, such as a compute node of a compute sled of a streaming array of a rack assembly.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A network architecture, comprising:

a plurality of rack assemblies, wherein each of the plurality of rack assemblies includes one or more sleds of compute nodes;

a cloud management controller configured for managing remote boot installation of a plurality of compute nodes;

wherein each sled includes:

the plurality of compute nodes, wherein the plurality of compute nodes includes a plurality of boot controllers configured for remote boot installation;

a board management controller (BMC) configured for managing system startup of the plurality of compute nodes;

a network storage; and a communication fabric coupled to the network storage and two or more compute nodes, wherein the cloud management controller sends a boot instruction to the BMC to load an operating system on a compute node, wherein the BMC is configured for sending the boot instruction to a boot controller of the compute node to load the operating system, wherein the boot controller of the compute node in response to receiving the boot instruction is configured for loading the operating system using corresponding basic input/output system (BIOS) firmware that is stored remote from the compute node, and wherein the communication fabric is configurable in a first configuration where the two or more compute nodes have direct access to the network storage, and further configurable in a second configuration where the two or more compute nodes have direct access to each other.

2. The network architecture of claim 1, wherein the boot controller is configured for receiving the BIOS firmware, and wherein the BIOS firmware is executed on the compute node to initiate the loading of the operating system.

3. The network architecture of claim 2, wherein the boot controller is configured for determining an address of remote storage storing the BIOS firmware based on the boot instruction, wherein the boot controller sends a request to access the address to the BMC, wherein the BMC forwards the request to access the address to remote storage to access the BIOS firmware, and wherein the BMC receives the BIOS firmware from the remote storage and forwards the BIOS firmware to the compute node.

4. The network architecture of claim 2, wherein system hardware on the compute node is initialized when executing the BIOS firmware.

5. The network architecture of claim 1, wherein the BMC accesses the BIOS firmware from internal memory, and wherein the BMC sends the BIOS firmware to the compute node.

6. The network architecture of claim 5, wherein the BIOS firmware is sent with the boot instruction to the compute node from the BMC.

7. The network architecture of claim 1, wherein the cloud management controller sends a start configuration instruction, including the boot instruction to load the operating system on the compute node, to a rack controller located on a rack assembly, and wherein the rack controller forwards the start configuration instruction to the BMC of a sled including the compute node.

8. The network architecture of claim 1, wherein each of the plurality of compute nodes on the sled is configured for executing one or more instances of a plurality of applications.

9. The network architecture of claim 8, wherein one of the plurality of applications is a video game.

10. An apparatus, comprising:

a plurality of compute nodes, wherein the plurality of compute nodes includes a plurality of boot controllers configured for remote boot installation; and a board management controller (BMC) configured for managing system startup of the plurality of compute nodes, wherein the BMC is configured for sending a boot instruction to a compute node of the plurality of compute nodes to load an operating system, wherein a boot controller of the compute node in response to receiving the boot instruction is configured for loading the operating system using corresponding basic input/output system (BIOS) firmware that is stored remote from the compute node, wherein the apparatus is further configured to:

suspend a job being performed during execution of an application by the compute node using a first operating system, wherein the job is suspended at a selected pause point that is not a predefined suspension point;

capture and store state data representing a current state of the job and the compute node;

transfer the stored state data to a different compute node of the plurality of compute nodes;

execute the job using on the different compute node using the transferred state data; and load a second operating system on the compute node.

11. The apparatus of claim 10, wherein the boot controller is configured for receiving the BIOS firmware, and wherein the BIOS firmware is executed on the compute node to initiate the loading of the operating system.

12. The apparatus of claim 11, wherein the boot controller is configured for determining an address of remote storage storing the BIOS firmware based on the boot instruction, wherein the boot controller sends a request to access the address to the BMC, wherein the BMC forwards the request to access the address to remote storage to access the BIOS firmware, and wherein the BMC receives the BIOS firmware from the remote storage and forwards the BIOS firmware to the compute node.

13. The apparatus of claim 11, wherein system hardware on the compute node is initialized when executing the BIOS firmware.

14. The apparatus of claim 10, wherein the BMC accesses the BIOS firmware from internal memory, and wherein the BMC sends the BIOS firmware to the compute node.

15. The apparatus of claim 14, wherein the BIOS firmware is sent with the boot instruction to the compute node from the BMC.

16. The apparatus of claim 10, wherein the BMC receives a start configuration instruction from a cloud management controller to load the operating system on the compute node, wherein the cloud management controller is configured for managing remote boot installation of compute nodes located on a plurality of rack assemblies, and wherein a rack assembly includes a plurality of sleds and each of the plurality of sleds includes one or more compute nodes.

17. The apparatus of claim 10, wherein each of the plurality of compute nodes is configured for executing one or more instances of a plurality of applications.

18. The apparatus of claim 17, wherein one of the plurality of applications is a video game.

19. An apparatus comprising:

a sled comprising a plurality of compute nodes, each compute node comprising a boot controller;

a plurality of communication interfaces providing communication to the plurality of compute nodes;

a board management controller (BMC) configured to manage system startup of the plurality of compute nodes, to manage the plurality of communication interfaces, and to provide boot instructions to each of the boot controllers using a selected one of the plurality of communication interfaces, wherein the BMC is configured to select one of the plurality of communication interfaces based on either a configuration of the sled or the operating system to be loaded on a compute node, and wherein, in response to receiving the boot instruction, the boot controller is configured to load an operating system for the compute node using basic input/output system (BIOS) firmware stored at a location remote from the compute node;

a network storage; and a communication fabric coupled to the network storage and two or more compute nodes, wherein the communication fabric is configurable in a first configuration where the two or more compute nodes have direct access to the network storage, and further configurable in a second configuration where the two or more compute nodes have direct access to each other.

20. The apparatus of claim 19 wherein the BIOS firmware is stored on one of a network storage or a cloud system.

* * * * *